(12) United States Patent
Verbakel et al.

(10) Patent No.: US 6,661,762 B1
(45) Date of Patent: Dec. 9, 2003

(54) METHOD AND DEVICE FOR INTERFACING VARIABLE-RATE SAMPLED DIGITAL AUDIO INFORMATION TO A STRING OF UNIFORM-SIZED BLOCKS, AND A UNITARY MEDIUM SO PRODUCED BY A WRITE-INTERFACING

(75) Inventors: Johannes M. M. Verbakel, Eindhoven (NL); Johannes J. Mons, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/341,911

(22) PCT Filed: Nov. 24, 1998

(86) PCT No.: PCT/IB98/01872

§ 371 (c)(1), (2), (4) Date: Jul. 20, 1999

(87) PCT Pub. No.: WO99/28912

PCT Pub. Date: Jun. 10, 1999

(30) Foreign Application Priority Data

Nov. 29, 1997 (EP) ............................................. 97203744

(51) Int. Cl.$^7$ ............................................. G11B 7/0045
(52) U.S. Cl. ................................ 369/59.25; 369/59.21; 369/59.26
(58) Field of Search ........................... 369/47.13, 47.35, 369/53.31, 59.21, 59.25, 59.26, 275.3

(56) References Cited

U.S. PATENT DOCUMENTS 5,452,006 A * 9/1995 Auld ..................... 375/240.26
5,652,824 A * 7/1997 Hirayama et al.
5,715,224 A * 2/1998 Fujinami

FOREIGN PATENT DOCUMENTS

EP 0795870 * 9/1997

* cited by examiner

Primary Examiner—W. R. Young (57) ABSTRACT

For mapping sampled digital audio information onto a linear physical mapping space that is partitioned in a string of uniform-sized blocks, in particular for variable-rate coded audio information that is distributed over successive audio units which are each composed from one or more audio packets, each block is supplemented with a block header for indicating an actual content of the block in question with respect to any constituent packet of the audio information.

35 Claims, 5 Drawing Sheets

```
                                                    # bits
audio_mux_stream () {
    for (i=0;<N_audio_blocks; n++)
    {
        audio_block ()                  audio_block_length
    }
} bits
audio_block () {
    audio_block_header ()

for (i=0;<N_packets; i++)
    {
        packet(datatype [i])            packet_length [i]
    }
}
```

FIG. 6

```
                                                    # bits
audio_block_header ( ) { non_audio_unit_start                             1 if (non_audio_unit_start=0 ) {
        packet_audio_unit_start                      1
        time_code                                    30
    } next_unit                                        4

N_packets                                        3 for (i=0;i<N_packets; i++)
    {
        data_type [i]                                5
        length [i]                                   11
    }
}
```

FIG. 7

| Data_type | CONTENT |
|---|---|
| 00000-00111 | RESERVED |
| 01000 | NON LOSSLESS CODED DSD 64 Fs STEREO |
| 01001-10101 | RESERVED |
| 10110 | LOSSLESS CODED DSD 48Fs STEREO |
| 10111 | LOSSLESS CODED DSD 48Fs MULTI CHANNEL |
| 11000 | LOSSLESS CODED DSD 64Fs STEREO |
| 11001 | LOSSLESS CODED DSD 64Fs MULTI CHANNEL |
| 11010-11011 | RESERVED |
| 11100 | CD TEXT |
| 11101-11110 | RESERVED |
| 11111 | STUFFING |

FIG. 8

|  | # bits | format | value |
|---|---|---|---|
| Audio_Header ( ) { | | | |
|   N_Packets | 3 | Uint3 | 1..7 |
|   N_Frame_Starts | 3 | Uint3 | 0..7 |
|   Reserved | 1 | Uint1 | 0 |
|   Lossless_Coded | 1 | Uint1 | |
|   for (p =1; p <= N_Packets; p ++) | | | |
|     Packet_Info ( ) [p] | 16 | Packet_Info | |
|   for (f =1; f <= N_Frame_Starts; f++) | | | |
|     Frame_Info ( ) [f] | 24 or 48 | Frame_Info | |
| } | | | |

FIG. 9

|  | # bits | format | value |
|---|---|---|---|
| Packet_Info [p] { | | | |
|   Frame_Start | 1 | Uint1 | 1..0 |
|   Reserved | 1 | Uint1 | 0 |
|   Data_Type [p] | 3 | Data_Type | 2,3,7 |
|   Packet_Length [p] | 11 | Uint1 | 1..2045 |
| } | | | |

FIG. 10

| VALUE | DEFINITION |
|---|---|
| 0..1 | RESERVED |
| 2 | AUDIO PACKET |
| 3 | SUPPLEMENTARY DATA PACKET |
| 4..6 | RESERVED |
| 7 | PADDING |

FIG. 11

METHOD AND DEVICE FOR INTERFACING VARIABLE-RATE SAMPLED DIGITAL AUDIO INFORMATION TO A STRING OF UNIFORM-SIZED BLOCKS, AND A UNITARY MEDIUM SO PRODUCED BY A WRITE-INTERFACING

BACKGROUND OF THE INVENTION

1. Field of the Invention

The invention relates to the field of is the well-known with digital audio encoding is the well-known Compact Disc system. Progress in storage technology and audio encoding technology allows increasing amount of audio information on a unitary medium such as conforming to the standard CD dimensions. A particular feature is variable-rate encoding, which requires an easy accessible indicator organization for subsequent read-accessing of the string of Audio Units.

The above citations are hereby incorporated herein in whole by reference, those skilled in the art are directed to the following references:

2. List of Related Documents (D1) Research Disclosure number 36411. August 1994, page 412–413
(D2) PCT/IB97/01156 (PHN 16.452) 1 bit ADC and lossless compression of audio
(D3) PCT/IB97/01303 (PHN 16.405) Audio compressor
(D4) EP-A 402,973 (PHN 13.241) Audio compression
(D5) 'A digital decimating filter for analog-to-digital conversion of hi-fi audio signals', by J. J. van der Kam in Philips Techn. Rev. 42, no. 6/7, April 1986, pp. 230–8
(D6) 'A higher order topology for interpolative modulators for oversampling A/D converters', by Kirk C. H. Chao et al in IEEE Trans. on Circuits and Systems, Vol 37, no. 3, March 1990, pp. 309–18.

SUMMARY OF THE INVENTION

It is an object of the present invention to allow a reader device to straightforwardly recover all information pertaining to an Audio Unit that may have been dispersed over various storage blocks or sectors.

The invention also relates to a unitary storage medium produced by practising such method, and to a reader device for reading a unitary storage medium so produced.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIGS. 1a, 1b a record carrier,
FIG. 2 a playback device,
FIG. 3 a recording device,
FIG. 4, a layout of a linear physical storage space.

DETAILED DESCRIPTION OF THE PREFERRED EMBODIMENT

Figures 1A, 1B:
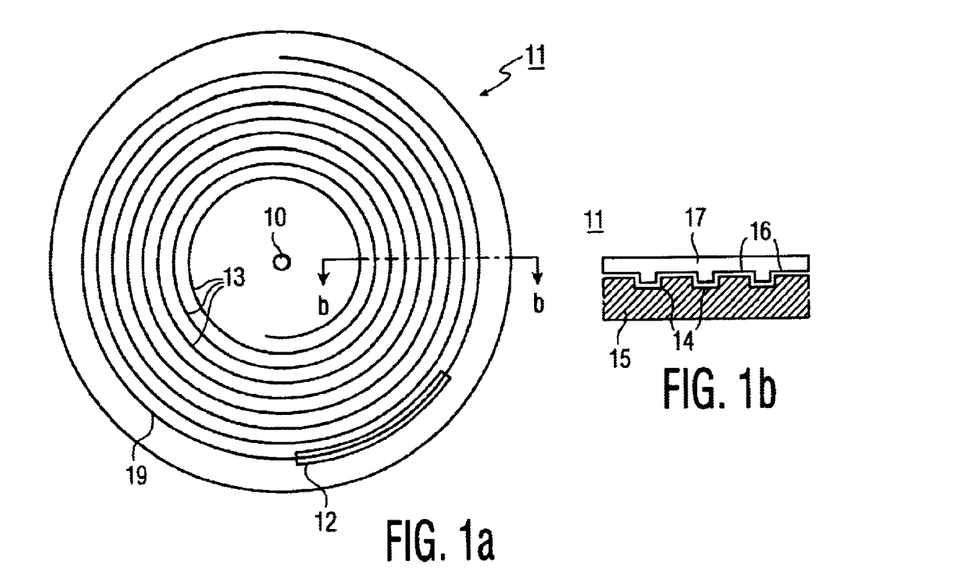

FIG. 1a shows a disc-shaped record carrier 11 with track 19 and central hole 10. Track 19 is arranged in a spiral pattern of turns forming substantially parallel tracks on an information layer. The carrier may be an optical disc with a recordable or a prerecorded information layer. Examples of a recordable disc are CD-R, CD-RW, and DVD-RAM, whereas audio CD is a prerecorded disc. Prerecorded discs can be manufactured by first recording a master disc and subsequently pressing consumer discs. Track 19 on the recordable record carrier is indicated by a providing a pre-embossed track structure during manufacture of the blank record carrier. The track may be configured as a pregroove 14 to enable a read/write head to follow the track 19 during scanning. The information is recorded on the information layer by optically detectable marks along the track, e.g. pits and lands.

FIG. 1b is a cross-section along the line b—b of a recordable record carrier 11, wherein transparent substrate 15 carries recording layer 16 and protective layer 17. The pregroove 14 may be implemented as an indentation, an elevation, or as a material property deviating from its surroundings.

For user convenience the audio information on the record carrier has been subdivided into items, which usually have a duration of a few minutes e.g. songs on an album or movements of a symphony. Usually the record carrier also contains access information for identifying the items, such as in a so-called Table Of Contents (TOC), or included in a file system like ISO 9660 for CD-ROM. The access information may include playing time and start address for each item, and also further information like a song title.

The audio information is recorded in digital representation after analog to digital (A/D) conversion. Examples of A/D conversion are PCM 16-bit per sample at 44.1 kHz known from CD audio and 1 bit Sigma Delta modulation at a high oversampling rate e.g. 64×Fs called bitstream. The latter method represents a high quality encoding method, with the choice between high quality decoding and low quality decoding, the latter allowing a simpler decoding circuit. Reference is made in this respect to the publications 'A digital decimating filter for analog-to-digital conversion of hi-fi audio signals', by J. J. van der Kam, document D5 infra, and 'A higher order topology for interpolative modulators for oversampling A/D converters', by Kirk C. H. Chao et al, document D6. After A/D conversion, digital audio is compressed to variable bitrate audio data for recording on the information layer. The compressed audio data is read from the record carrier at such a speed, that after decompression substantially the original timescale will be restored when reproducing the audio information continuously. Hence the compressed data must be retrieved from the record carrier at a speed dependening on the varying bitrate. The data is retrieved from the record carrier at so-called transfer speed, i.e. the speed of transferring data bytes from the record carrier to a de-compressor. The record carrier may have uniform spatial data density, which gives the highest data storage capacity per unit of area. In such system the transfer speed is proportional to the relative linear speed between the medium and the read/write head. If a buffer is provided before the de-compressor, the actual transfer speed is the speed before that buffer.

Figure 2:
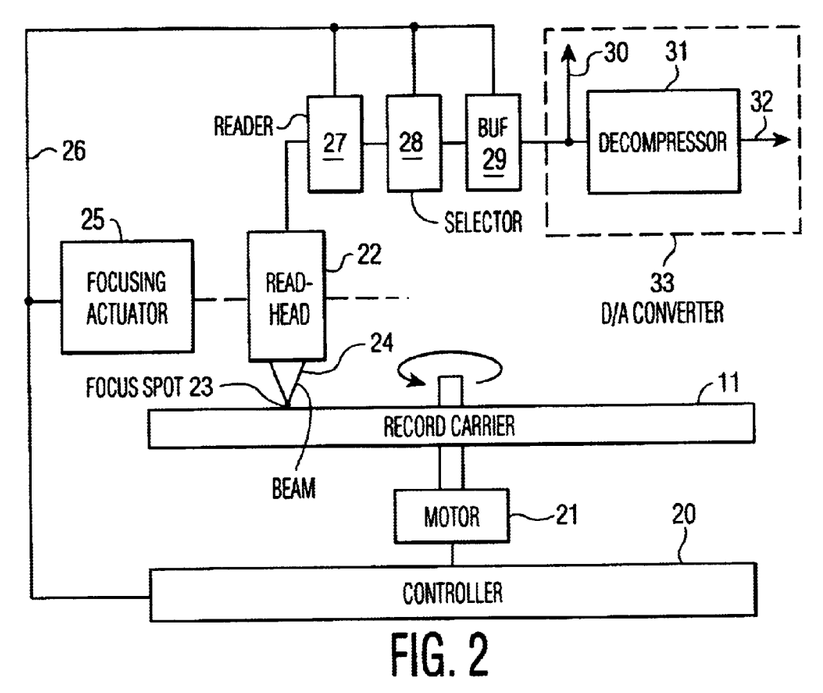

FIG. 2 shows a playback apparatus according to the invention for reading a record carrier 11 of the type shown in FIG. 1. The device has drive means 21 for rotating record carrier 11 and a read head 22 for scanning the record carrier track. Positioning means effect 25 coarse radial positioning of read head 22. The read head comprises a known optical system with a radiation source for generating a beam 24 that is guided through optical elements and focused to spot 23 on an information layer track. The read head further comprises a focusing actuator for moving the focus of the radiation 24 along the optical axis of the beam and a tracking actuator for fine positioning of spot 23 in a radial direction on the centre of the track. The tracking actuator may comprise coils for moving an optical element or may be arranged for changing the angle of a reflecting element. The radiation reflected by the information layer is detected by a known detector in the read head 22, e.g. a four-quadrant diode, to generate a read signal and further detector signals including a tracking error and focusing error signals for the tracking and focusing actuators, respectively. The read signal is processed by a reading means 27 to retrieve the data, which reading means are of a usual type for example comprising a channel decoder and an error corrector. The retrieved data is passed to a data selection means 28, to select the compressed audio data for passing on to buffer 29. The selection is based on data type indicators also recorded on the record carrier, e.g. headers in a framed format. From buffer 29, the compressed audio data are passed on to de-compressor 31 as signal 30. This signal may also be outputted to an external de-compressor. De-compressor 31 decodes the compressed audio data to reproduce the original audio information on output 32. The de-compressor may be fitted separately, e.g. in a stand-alone high quality audio digital to analog convertor (D/A convertor), as indicated by dashed rectangle 33 in FIG. 2. Alternatively, the buffer may be positioned before the data selections means. The buffer 29 may be positioned in a separate housing or may be combined with a buffer in the decompressor. The device furthermore has a control unit 20 for receiving control commands from a user or from a host computer not shown, that via control lines 26 such as a system bus is connected to drive means 21, positioning means 25, reading means 27 and data selection means 28, and possibly also to buffer 29 for buffer filling level control. To this end the control unit 20 may comprise control circuitry, such as a microprocessor, a program memory and control gates, for performing the procedures described below. Control unit 20 may be implemented as a logic circuit state machine.

Audio compression and de-compression of a suitable type are known. Audio may be compressed after digitizing by analyzing the correlation in the signal, and producing parameters for fragments of a specified size. During de-compression the inverse process is used to reconstruct the original signal. If the original digitized signal is reconstructed exactly, the (de-)compression is called lossless, whereas lossy (de)-compression will not reproduce certain details of the original signal which however are substantially undetectable by the human ear or eye. Most known systems for audio and video, such as DCC or MPEG, use lossy compression, whereas lossless compression is used for storing computer data. Examples of audio compression and decompression can be found in D2, D3 and D4 hereinafter, of which in particular the lossless compression from D2 is suitable for high quality audio.

The data selection means 28 are arranged to discard any stuffing data, that had been added during recording. When the control unit 20 is commanded to reproduce an item of audio from the record carrier, the positioning means 25 are controlled to position the reading head on the portion of the track containing the TOC. The starting address for that item will then be retrieved from the TOC via the data selection means 28. Alternatively the contents of the TOC may be read only once and stored in a memory when the disc is inserted in the apparatus. For reproducing the item, the drive means 21 are controlled to rotate the record carrier at the appropriate speed. The required rotation rate may be denoted as such for setting the drive means. Alternatively, the rotation rate may be ajdusted through time codes that are stored together with the audio data to indicate the associated replay duration.

To provide continuous reproduction without buffer underflow or overflow the transfer speed is coupled to the reproduction speed of the D/A converter, i.e. to the bitrate after decompression. To this end the apparatus may comprise a reference frequency source for controlling the decompressor and the rotation rate may be set in dependence on the reference frequency and the speed profile. Alternatively or additionally the rotation rate may be adjusted using the average filling level of the buffer 29, e.g. by decreasing the rotation rate when the buffer is more than 50% full on average.

Figure 3:
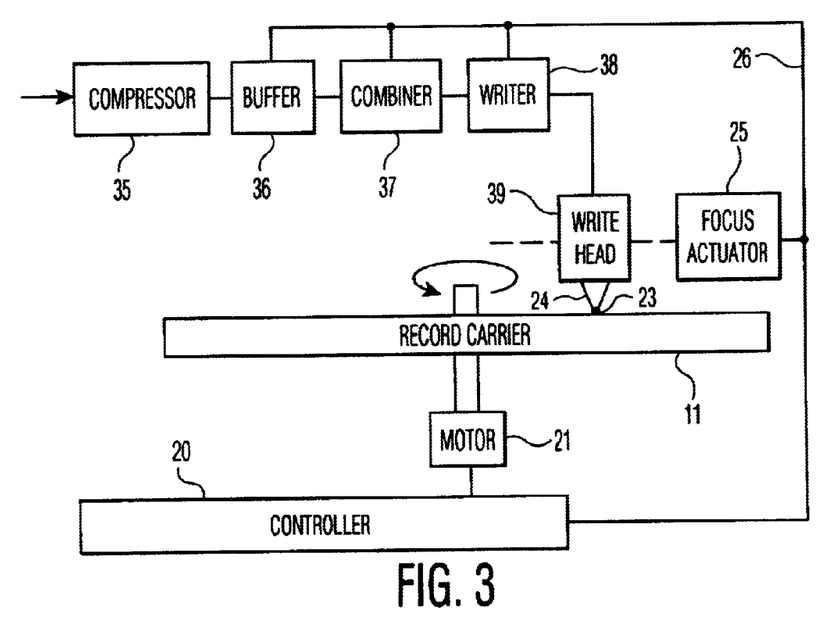

FIG. 3 shows a recording device for writing information according to the invention on a record carrier 11 of a type which is (re)writable. During a writing operation, marks representing the information are formed on the record carrier. The marks may be in any optically readable form, e.g. in the form of areas whose reflection coefficient differs from their surroundings, through recording in materials such as dye, alloy or phase change, or in the form of areas with a direction of magnetization different from their surroundings when recording in magneto-optical material. Writing and reading of information for recording on optical disks and usable rules for formatting, error correcting and channel coding, are well-known, e.g. from the CD system. Marks may be formed through a spot 23 generated on the recording layer via a beam 24 of electromagnetic radiation, usually from a laser diode. The recording device comprises similar basic elements as described with reference to FIG. 2, i.e. a control unit 20, drive means 21 and positioning means 25, but it has a distinctive write head 39. Audio information is presented on the input of compression means 35, which may be placed in a separate housing. Suitable compression has been described in D2, D3 and D4. The variable bitrate compressed audio on the output of the compression means 35 is passed to buffer 36. From buffer 36 the data is passed to data combination means 37 for adding stuffing data and further control data. The total data stream is passed to writing means 38 for recording. Write head 39 is coupled to the writing means 38, which comprise for example a formatter, an error encoder and a channel encoder. The data presented to the input of writing means 38 is distributed over logical and physical sectors according to formatting and encoding rules and converted into a write signal for the write head 39. Unit 20 is arranged for controlling buffer 36, data combination means 37 and writing means 38 via control lines 26 and for performing the positioning procedure as described above for the reading apparatus. Alternatively the recording apparatus may be arranged for reading having the features of the playback apparatus and a combined write/read head.

Figure 4:
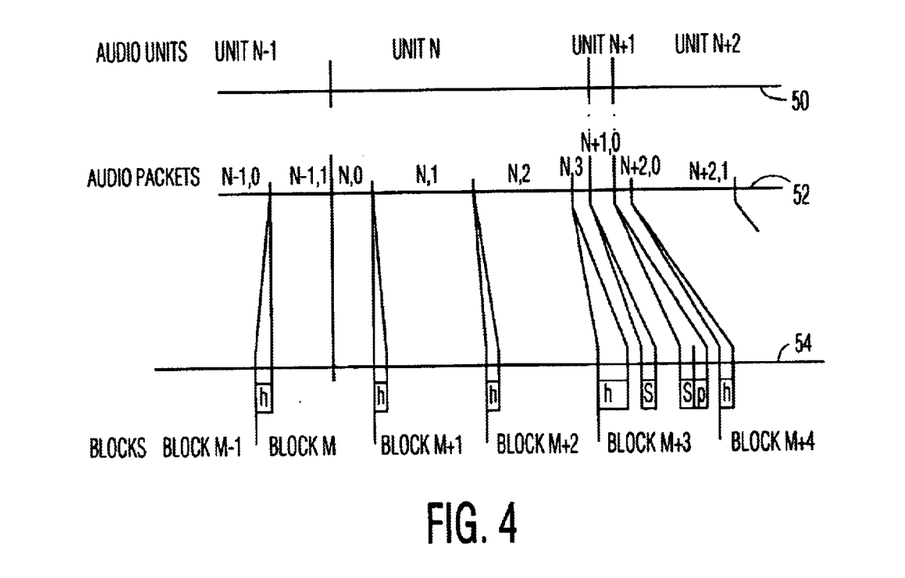

FIG. 4 is a layout of a linear physical storage space. Upper trace 50 shows the distribution of the audio stream into so-called Audio Units. For the Audio Units, analog audio may be sampled to produce one-bit signals at a multiple of 44.1 kHz, which is the standard sampling frequency of Compact disc. When the multiplicity is 64-fold, stereo quality requires a data rate of about 5.6 Mbits/second. A tighter format is attained through loss-less audio coding to increase storage density by a factor of about 2, but as shown in FIG. 1, this will produce Audio Units N−1 to N+2 that can have mutually non-uniform sizes. On the other hand, storage on a unitary medium such as disc or tape, or transmission via a physical transmission medium is preferably organized in compartments that have mutually uniform dimensions, which has been indicated by blocks or sectors M−1 to M+4 on line 54. For enabling fast access to the blocks, each block has a header h, which during reading will obviate the need to parse the audio stream. Various blocks, such as blocks M and M+1 accommodate an audio packet from only a single Audio Unit, such as in this case Audio Unit N. However, maximum storage density is attained as shown through joining various audio packets into a single storage block, such as joining audio packets N−1,1 and N,0 into block M, and also packets N,3, N+1,0 and N+2,0 into block M+3. In the Figure, the packets as shown on line 52 have as first index the number of their Audio Unit, and as second index the number within their audio block (running from 0 upwards). As shown, packets have a maximum size so that a packet will always fit into a single standard-sized block. On the other hand, minimum size of a packet is down to an applicable granularity level of the storage-per-block. The number of packets per Audio Unit has an upper bound that is determined only by the maximum size of an Audio Unit.

Figure 5:
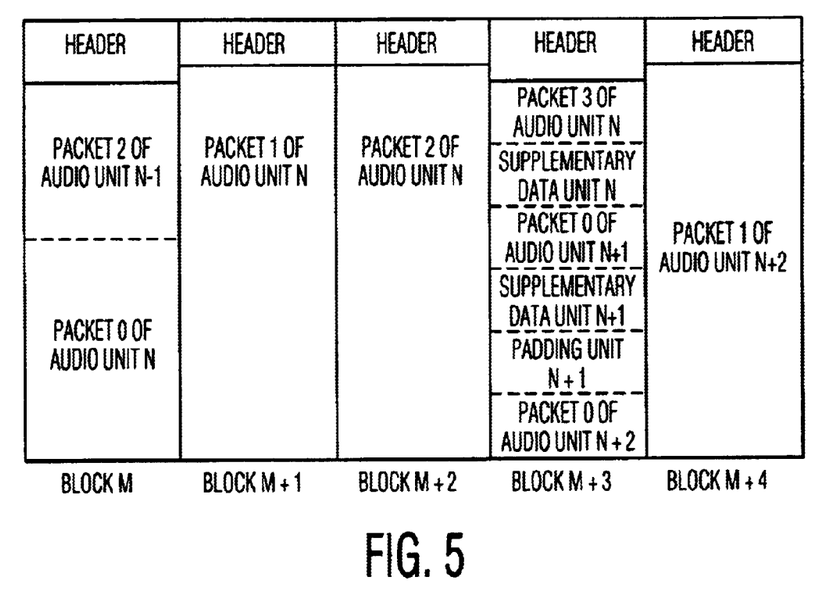
FIG. 5, a storage format according to the invention.

Table 1 shows the storage format according to the invention, for the same configuration as shown in FIG. 4. Here, each column pertains to a single block M to M+4. Each block starts with a header area, that may have a non-uniform size. Furthermore, each block contains an integer number of packets that may have mutually non-uniform sizes. In addition to the Audio Units, the storage may contain one or more Supplementary Data Units as accessory to a particular Audio Unit, and one or more padding or stuffing units as further accessory to a particular Audio Unit. Padding renders the bit rate constant, and represents dummy data for maintaining an appropriate buffer filling degree. Supplementary data may pertain to an arbitrary layer of functionality, such as the subcode.

An Audio Unit or a frame may start on any position within a particular Block. Audio Units may transgress the edge of a Block, and in the embodiment, an Audio Unit will in general be larger than one Block. However, an Audio Unit may be so short that it would fit within a single Block. A single Block could therefore contain the starting point of a plurality of Audio Units. A frame relates to an actual duration of audio at replay, to wit, 1/75 of a second. Next to audio, it contains various informations that pertain to its audio. A sector also has an integer number of packets.

Figure 6:
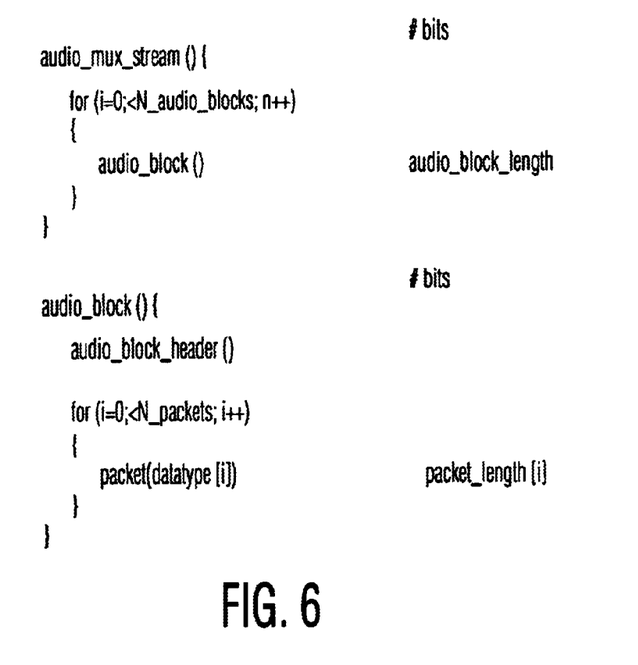
FIG. 6, a syntax of an audio stream.

Table 2 illustrates the syntax of an audio stream according to the invention, written in the well-known Computer Language C. The first part relates to the Audio Mux Stream that contains a looped specification of Audio Blocks numbering 0 ... N. Note that in the disclosure, N indicates an arbitrary parameter. The number of bits (right hand column) of the block in question is defined by the block length. The second part of the Table is again in C, and relates to a single Audio Block that contains an Audio Block Header and a looped specification of Packets numbering 0 ... N. The number of bits of the packet in question is defined by its length. As recited, the data may have one of a plurality of respective data types.

Figure 7:
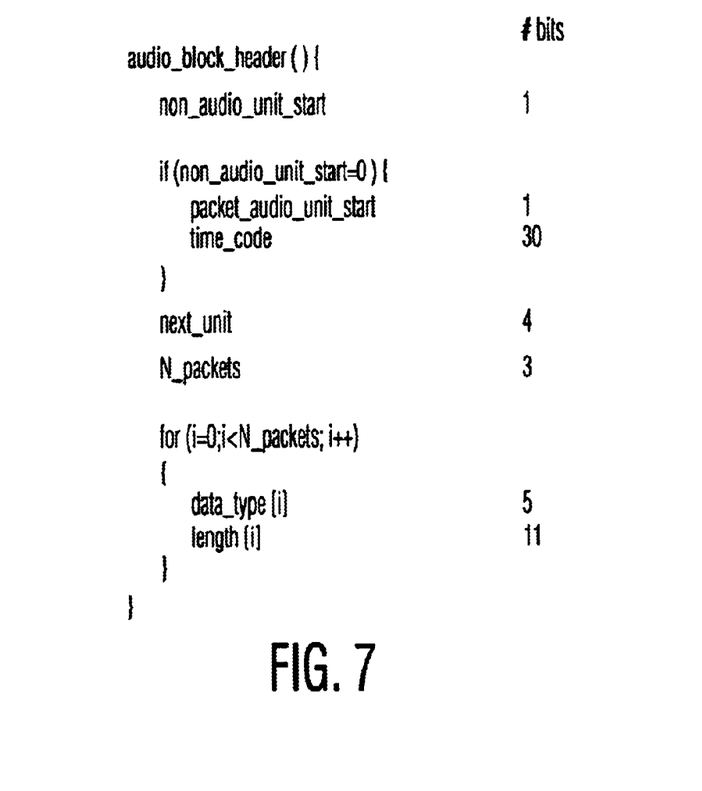
FIG. 7, a header format.

Table 3 shows a header format of a preferred but exemplary embodiment according to the invention, again written in C. The numbers of bits of the various parts have been specified in the right hand column. The first bit indicates whether the block in question contains the beginning point of an Audio Unit. If positive, the following 48 bits specify various parameters of this Audio Unit, to wit: a single bit that indicates the effective start of this Audio Unit, a 30-bit time code for use by a reader device to effect functions such as jumping by a prespecified amount of time. The second part of the header is always present. In the first place, it specifies the distance measured in number of blocks, up to 15, until the next Audio Unit start, to allow a logic jump to the next Audio Unit. Each unit is linked to a single time code, and vice versa. Functionally, the storage may be multiplexed among audio units, padding units, and supplementary data units.

In consequence, going to a particular unit may simply be effected by waiting for a predetermined time interval until passage of the storage area of this next unit, through the continuing drive motion of a storage medium such as a disc. Often, cross-track jumping will speed-up this process, but it even applies if for some reason such cross-track jumping would not be allowed. Further, the header specifies the number of Packets within the block by 3 bits. Next, for each such packet, there is a looped specification of the data_type of that packet through 5 bits, and of its length in 11 bits. Also the number of packets is therefore codetermining for the length of the header in question. Generally, there is a two-level addressing organization: first the correct sector or block is addressed, through the next_unit_indicator. Subsequently, local addressing is effected, through the local block header that indicates the address, such as through signalling the lengths of one or more packets.

Figure 8:
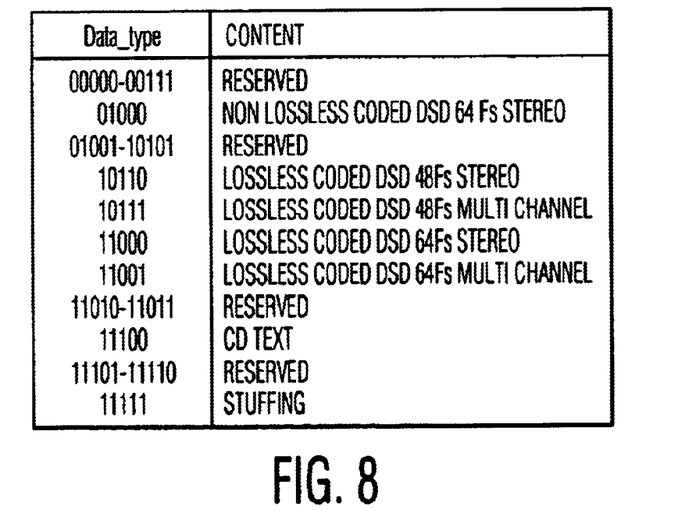
FIG. 8, a data_type specification list.

Table 4 shows a data type specification through the 5bits indicated therefor by Table 3. Various ones of the 32 combinations have been reserved. Five are used for specifying various coding types. One indicates the occurrence of CD-text. The remainder has been reserved.

Figure 9:
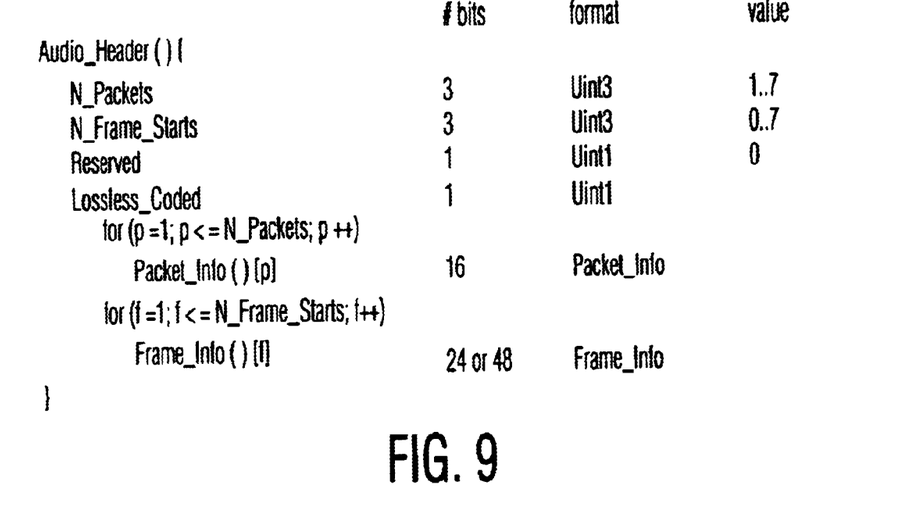
FIG. 9, an audio block header syntax.

Table 5 shows an audio block header syntax. The names of the various items, the numbers of bits, the format, and if applicable, the values have been indicated. The frame info can contain a time code. Note that the next unit indicator of Table 3 has been suppressed.

Figure 10:
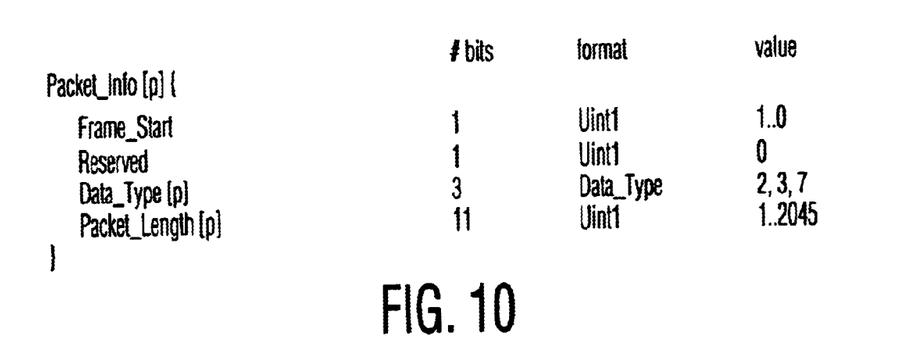
FIG. 10, a packet information syntax.

Table 6 shows a packet information syntax. The names of the various items, the lengths in bits, the format, and if applicable, the values have been indicated.

Figure 11:
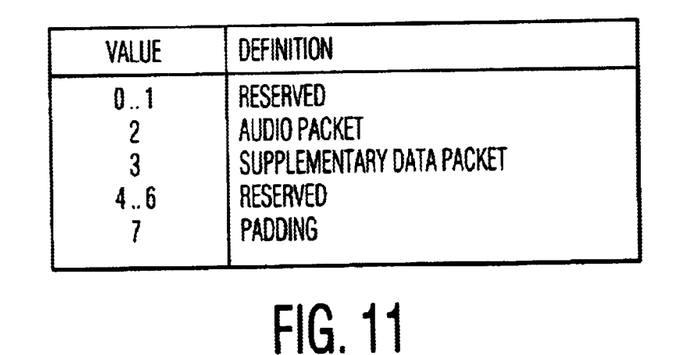
FIG. 11, another data type definition.

Table 7 shows a different data type definition, as varying from Table 4. The various types of audio packets can now be defined in the applicable area_TOC. Note that CD TEXT corresponds to a supplementary data packet.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A method for processing audio information, comprising the steps of:

providing a linear physical mapping space that is partitioned into a string of blocks, wherein each block has a same size;

sampling the audio information;

variable-rate encoding the sampled audio information;

arranging the variable-rate encoded audio information in successive variable-sized audio packets, each audio packet having a size not larger than the same size of each block;

mapping the successive audio packets onto the successive blocks of the linear physical mapping space, said mapping including distributing the successive audio packets over successive Audio Units of the mapping space such that each Audio Unit includes audio data for replay for a predetermined duration and comprises one or more of said successive audio packets, each block including audio content comprising an integral number of audio packets, said integral number of audio packets including at least one audio packet of one or more of said Audio Units; and indicating in a block header at the beginning of each block information about the distribution of the Audio Units and associated audio packets over the string of blocks, said information obviating a need to parse the audio content in order to subsequently access any Audio Unit of the successive Audio Units.

2. The method of claim 1, further comprising inserting at least one of a padding unit and a supplementary data unit into at least one of said blocks.

3. The method of claim 1, wherein the mapping space is a linear physical storage space of an optically readable disc.

4. The method of claim 1, wherein each block header points to a start of a next-following Audio Unit.

5. The method of claim 1, wherein the block header uniformly indicates, for each audio packet, an associated data type and packet length.

6. The method of claim 1, wherein when the block header contains a starting point of a particular Audio Unit, the block header specifying a time code of the particular Audio Unit.

7. A device, comprising:
a unitary storage medium comprising a linear physical mapping space that is partitioned into a string of successive blocks, wherein each block has a same size;
sampling means for sampling the audio information;
encoding means for variable-rate encoding the sampled audio information; and formatting means for:
arranging the variable-rate encoded audio information in successive variable-sized audio packets, each audio packet having a size not larger than the same size of each block;
mapping the successive audio packets onto the successive blocks of the linear physical mapping space, said mapping including distributing the successive audio packets over successive Audio Units of the mapping space such that each Audio Unit includes audio data for replay for a predetermined duration and comprises one or more of said successive audio packets, each block including audio content comprising an integral number of audio packets, said integral number of audio packets including at least one audio packet of one or more of said Audio Units, and
indicating in a block header at the beginning of each block information about the distribution of the Audio Units and associated audio packets over the string of blocks, said information obviating a need to parse the audio content in order to subsequently access any Audio Unit of the successive Audio Units.

8. The device of claim 7, wherein the unitary storage medium includes an optically recordable disc.

9. The device of claim 7, comprising:
reading means for reading the blocks;
detecting means for detecting one or more block headers that collectively indicate one or more packets within a single Audio Unit; and
assembling means for assembling the Audio Unit from its packets for presentation to a user.

10. The device of claim 7, further comprising:
holding means for holding and driving the medium; and
accessing means for accessing the medium and feeding the reading means.

11. The device of claim 7, wherein the formatting means further comprises means for inserting at least one of a padding unit and a supplementary data unit into at least one of said blocks.

12. The method of claim 7, wherein the formatting means further comprises means for including in each block header a pointer to a start of a next-following Audio Unit.

13. A method comprising:
sampling the audio information;
variable-rate encoding the audio information;
arranging the encoded audio information in successive non-uniform-sized audio units, wherein an audio unit contains audio data for replay for a predetermined duration;
adding block headers to uniform sized blocks containing information related to the audio units in a block;
dividing the audio units into successive non-uniform sized audio packets having a size not larger than the size of a block for fitting one or more audio packets into a block;
distributing the audio packets among the blocks; and
indicating in a block header of each block of multiple blocks the actual content of the block with respect to the presence of the start of an audio unit in the block.

14. The method of claim 13, wherein the method further comprises indicating in the block header the presence of a start of an audio unit in a block by a logical "non-audio unit start" indicator.

15. The method of claim 14, wherein the method further comprises indicating in the block header the presence of a start of an audio unit in an audio packet by a logical "packet audio unit start" indicator.

16. The method of claim 13, wherein the method further comprises pointing in a block header of a block to a block containing the start of a next following audio unit.

17. The method of claim 13, wherein the method further comprises indicating in the block header of a block, for each audio unit of multiple audio units, an associated data type and packet length.

18. The method of claim 13, wherein the block header contains a starting point of a particular audio unit, wherein the method further comprises specifying in the block header, a time code of the particular audio unit.

19. The method of claim 13, wherein the method further comprises dividing supplementary data packets or padding packets among the blocks.

20. The method of claim 13, wherein the mapping space is a linear physical storage space of an optically readable disc.

21. The method of claim 13, wherein the predetermined duration of replay of the audio information contained in the audio units is the same for multiple audio units.

22. A unitary storage medium, comprising:
a substrate with information tracks;
digital audio signals partitioned along a string of uniform-sized blocks stored in the tracks;
wherein:
the digital audio information signals represent variable-rate encoded audio information, arranged in successive non-uniform sized audio units, wherein an audio unit contains audio data for replay for a predetermined duration;
the blocks include block headers containing information related to the audio units in a block;

the audio units are divided in successive non-uniform sized audio packets having a size not larger than the size of a block for fitting one or more audio packets into a block;

the audio packets are distributed among the blocks; and the block header indicates the actual content of each block of multiple blocks with respect to the presence of the start of an audio unit in the block.

23. The medium of claim 22, wherein the block header includes a logical "non-audio unit" indicator for indicating the presence of a start of an audio unit in a block.

24. The medium of claim 23, wherein the block header includes a logical packet audio unit start indicator for indicating a start of an audio unit in an audio packet.

25. The medium of claim 22, wherein each block header of multiple blocks includes a pointer to a block containing the start of a next following Audio Unit.

26. The medium of claim 22, wherein the block header uniformly indicates, for each Audio Unit of multiple Audio Units, an associated date type and packet length.

27. The medium of claim 22, wherein the block header contains a starting point of a particular audio unit, the block header specifying a time code of the particular audio unit.

28. The medium of claim 22, wherein the supplementary data packets or padding packets are divided among the blocks.

29. The medium of claim 22, characterized in that the storage medium is of the optically readable type.

30. The medium of claim 22, wherein the predetermined duration of replay of the audio information contained in the audio units is the same for multiple audio units.

31. A recording device comprising:

sampling means for sampling audio information;

encoding means for variable-rate encoding said sampled audio-information;

formatting means for arranging the encoded audio information in successive non-uniform-sized audio units, wherein an audio unit contains audio data for replay for a predetermined duration; and for generating block header information containing information related to the audio units in a block; and for dividing the audio units into successive non-uniform sized audio packets having a size not larger than the size of a uniform-sized blocks for fitting one or more audio packets into one block of the blocks; and for distributing the audio packets among the blocks; the block header including the actual content of the block with respect to the presence of the start of an audio unit in the block; and writing means for writing the audio units and block header information into the blocks.

32. The recording device of claim 31, wherein the formatting means are adapted to generate a logical non-audio unit start indicator for a block header of block containing a start of an audio unit.

33. The recording device of claim 32, wherein the formatting means are adapted to generate a logical packet audio unit start indicator for a block header of a block containing a start of a preceding audio unit.

34. The recording device of claim 31, wherein the formatting means are adapted to generate and store in a block header of a block containing the start of a particular audio unit, a time code of the audio unit.

35. The recording device of claim 31, wherein the predetermined duration of replay of the audio information contained in the audio units is the same for multiple audio units.

* * * * *